UNITED STATES PATENT OFFICE.

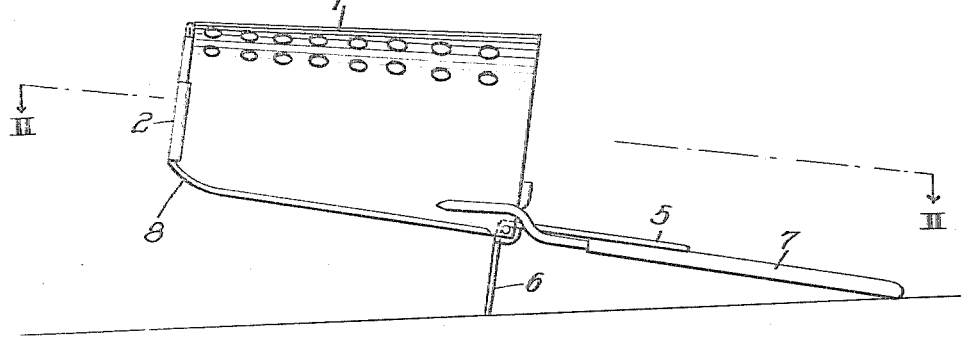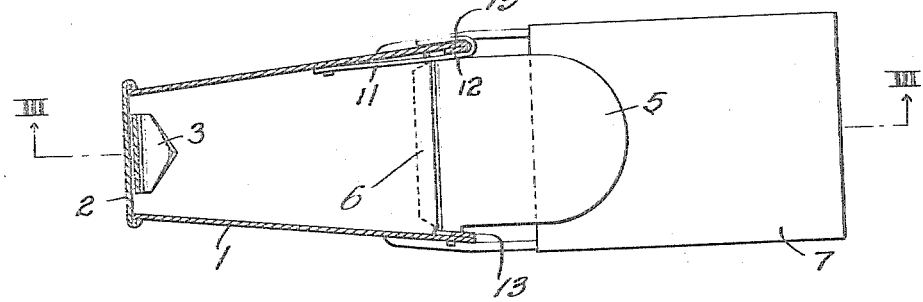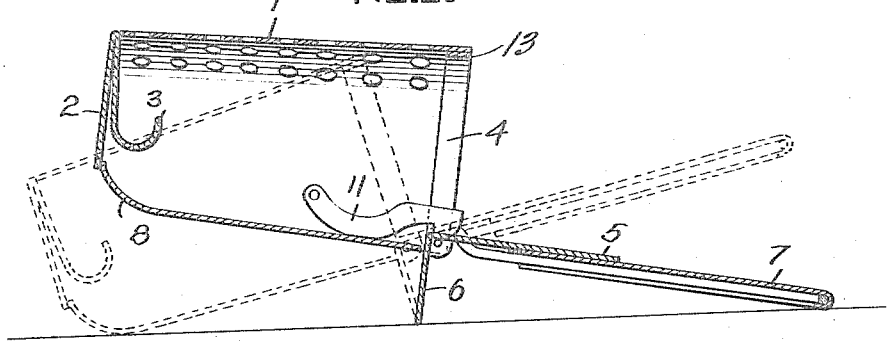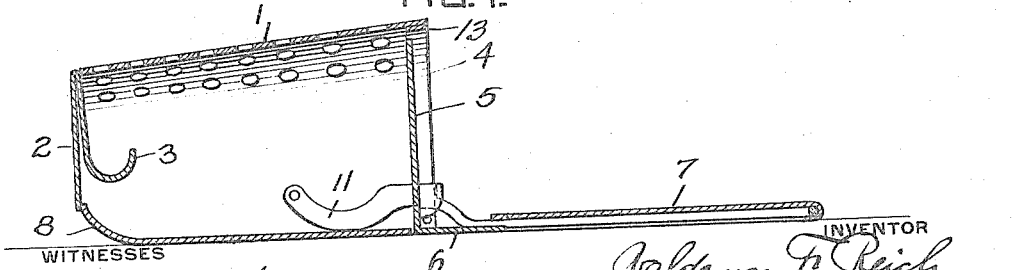

VALDEMAR F. REICH, OF PITTSBURGH, PENNSYLVANIA.

ANIMAL-TRAP.

1,273,185.   Specification of Letters Patent.   Patented July 23, 1918.

Application filed October 27, 1917.   Serial No. 198,785.

*To all whom it may concern:*

Be it known that I, VALDEMAR F. REICH, residing at Pittsburgh, in the county of Allegheny and State of Pennsylvania, a citizen of the United States, have invented or discovered certain new and useful Improvements in Animal-Traps, of which improvement the following is a specification.

The object of my invention is to provide an animal trap which is simple in construction, and effective for its intended purpose, and which may be easily set without liability of injury to the person setting it.

In the accompanying sheet of drawings which forms part of my specification, the preferred embodiment of my invention is illustrated. Figure 1 is a side elevation of the trap set for catching an animal; Fig. 2 is a sectional view taken on the line II—II, Fig. 1; Fig. 3 a sectional view taken on the line III—III, Fig. 2, the trap being indicated in dotted lines in the act of being closed; and Fig. 4 a view similar to Fig. 3 showing the trap in closed position.

The trap which I provide includes a cage provided with an entrance, and of such size and form as to receive the animal desired to be caught. Secured to the cage and projecting laterally therefrom, there is a counterweight which coöperates with a foot pivoted to the trap to hold the cage in an elevated overhanging position; that is to say, in a position projecting beyond the foot at the opposite side thereof to the counterweight. A door is provided for the cage entrance and is connected to the pivoted foot in such manner that when an animal enters the overhanging cage, and causes it to fall from its supported position, the foot will close the door.

While the trap which I have provided may be used for trapping various animals, that shown herein is particularly adapted to catch rats or mice. Referring to the embodiment of my invention illustrated in the drawing, the cage 1, which is of tapered elongated form, is provided at its outer end with a slidably mounted closure 2, to which there is attached a suitable support, such as a hook 3, for bait. The closure 2 is slidably mounted so that it may be removed, by sliding it upwardly, to bait the hook 3. With respect to this connection, it will be observed that only the lower portion of the closure 2 has sliding engagement with the cage 1, and that therefore the closure may be removed after it has been slid upwardly about half of its depth.

The opposite end of the cage is open to form an entrance 4 adapted to be closed by a door 5. At the entrance 4 the cage 1 may be provided with a reinforcing band 13. The foot for supporting the cage 1 in its elevated overhanging position, as indicated in Fig. 1, preferably comprises a plate 6 pivoted to the trap on a horizontal axis at the bottom of the entrance 4. The counterweight, which coöperates with the foot 6 to hold the cage in its elevated position, preferably comprises a plate 7 lying in the general plane of the bottom of the cage and of such weight as to hold the cage in the position indicated.

The door 5 may be variously connected to the foot 6 so that when the cage falls or rotates about the lower edge of the foot as a pivot the door will be closed. Preferably, however, the door is attached directly to or forms a continuation of the upper end of the foot, the door lying above and the foot below the plate 7. It will be seen that by such construction and arrangement the foot 6 may not move farther toward the bottom of the cage 1 than the position indicated in Fig. 1, and that the door 5 may not move farther within the cage than is indicated in Fig. 4. That is to say the foot 6 and door 5 lying on opposite sides of plate 7, and disposed at substantially right angles to each other, may not, because of the intervening plate, move beyond the alternate positions indicated in Figs. 1 and 4.

To set the trap it is only necessary to hold it in the inclined position indicated in Fig. 1 and place it upon a floor or other support. A mouse or other animal in quest of the bait secured to the hook 3 may walk up the inclined plate 7 and into the entrance of the cage. As soon as the weight of the animal entering the cage overcomes the counterbalancing effect of the plate 7, the cage drops downwardly, rotating about the lower edge of the foot 6 in the manner indicated by dotted line in Fig. 3. In this position the center of gravity of the cage falls between the forward end of the cage and the lower edge of the pivoted foot thus causing a thrust upon these supporting points which causes the trap to immediately drop to the position indicated in Fig. 4.

That there may be no tendency for the cage and foot to retain their relative positions indicated in dotted lines in Fig. 3, the forward lower end of the cage is preferably rounded as indicated at 8.

It will be understood that, when the trap is closed, the door 5 may not readily be opened by an animal within the cage, because to do so it is necessary for the animal to exert sufficient force upon the door to lift a portion of the weight of the trap and also a portion of the animal's own weight. If desired, however, a catch 11 may be pivoted to the side of the cage 1, and the door 5 may be shaped to form a detent 12 for engagement by the catch when the door is opened. The outer end of the catch is rounded so that, as the door is closed, the catch will be raised to a position wherein it will fall behind the detent 12 when the door is completely closed.

According to the provisions of the patent statutes, I have described the principle and operation of my invention, together with the construction which I now consider to represent the best embodiment thereof. However, I desire to have it understood that within the scope of the appended claims, my invention may be practised by other forms of construction than that particularly shown and described herein.

I claim as my invention:

1. An animal trap comprising a cage provided with an entrance, a counterweight connected to said cage, a foot pivoted in a position between the centers of gravity of said cage and counterweight and coöperating with said counterweight to hold said cage in an elevated position projecting beyond said foot, and a door for said cage entrance connected to said foot, said door being open when the cage is supported in elevated position by said foot and adapted to be closed when the weight of an animal entering said cage overbalances said counterweight.

2. An animal trap comprising a cage provided with an entrance, a counterweight connected to said cage and projecting outwardly from the entrance thereof, a door pivoted on a horizontal axis at the bottom of said entrance and disposed above said counterweight, and a foot secured to said door and adapted to hold said cage in elevated position when the door is opened.

3. An animal trap comprising a cage provided with an entrance, a plate secured to said cage and projecting outwardly from said entrance, a door pivoted on a horizontal axis at the bottom of said entrance and disposed above said plate, and a foot secured to and adapted to swing with said door on the pivotal axis thereof, the weight of said plate being adapted, when the door is opened, to hold the cage in elevated position projecting beyond said foot.

4. An animal trap comprising a cage provided with an entrance, a plate secured to said cage and projecting outwardly from the entrance and lying in the general plane of the bottom of said cage, a door for said entrance disposed above and a supporting foot for said cage disposed below said plate, said door and foot being secured substantially at right angles to each other and pivoted on a horizontal axis at the bottom of the cage entrance.

5. An animal trap comprising a cage provided with an entrance, a counterweight connected to and projecting outwardly from the entrance of said cage and affording a runway to the entrance of the cage, a door for said entrance disposed above and a supporting foot for said cage disposed below said counterweight, said door and foot being secured at an angle to each other and pivoted on a horizontal axis at the bottom of the cage entrance, said foot coöperating with said counterweight to hold the cage in an elevated position projecting beyond said foot when the door is in open position, and said door being adapted to be closed when the weight of an animal entering said cage overbalances said counterweight.

In testimony whereof I have hereunto set my hand.

VALDEMAR F. REICH.

Witnesses:
PAUL N. CRITCHLOW,
FRANCES J. TOMASSON.